United States Patent Office 3,721,548
Patented Mar. 20, 1973

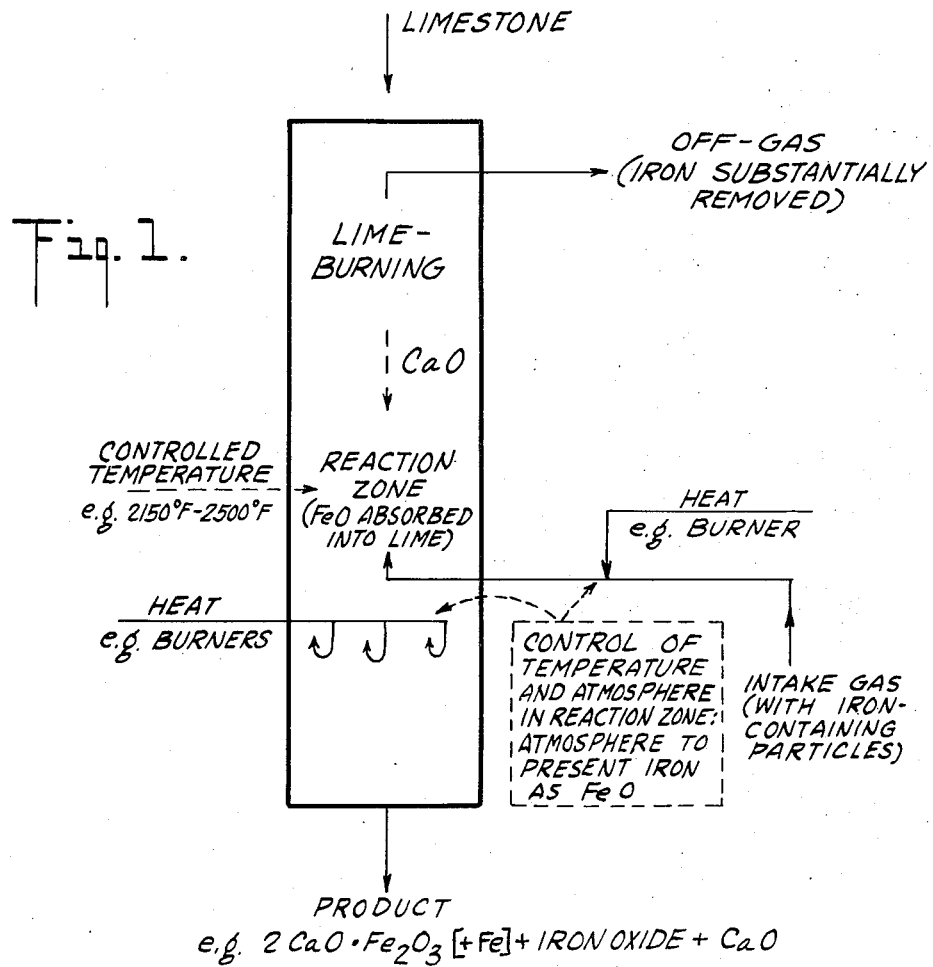
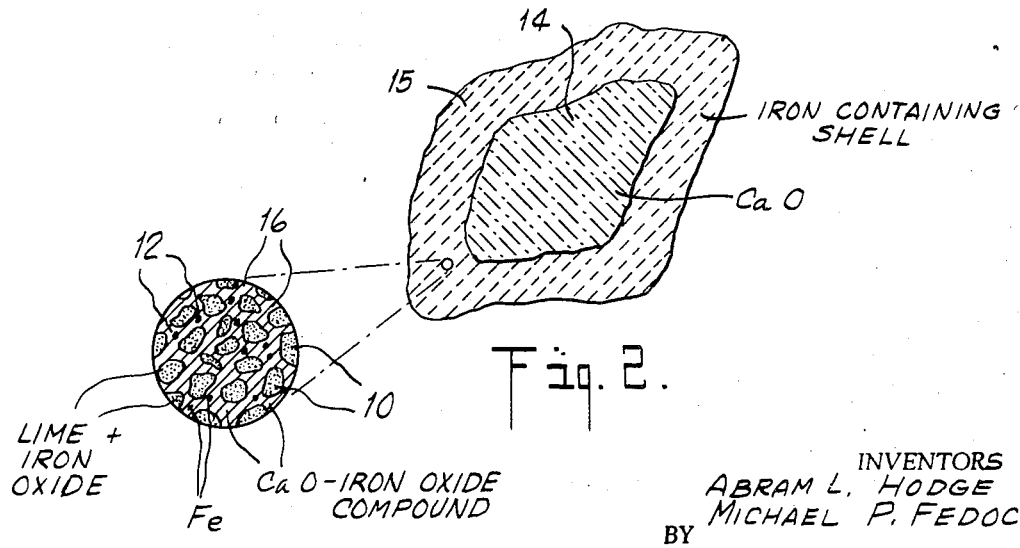

3,721,548
TREATMENT OF IRON-CONTAINING PARTICLES
Abram L. Hodge, Cranford, N.J., and Michael P. Fedock, Cleveland, Ohio, assignors to Republic Steel Corporation, Cleveland, Ohio
Filed Dec. 23, 1968, Ser. No. 786,100
Int. Cl. C21b 3/04, 1/00, 1/08
U.S. Cl. 75—25
14 Claims

ABSTRACT OF THE DISCLOSURE

Iron-containing particles such as fume in steel furnace gases are removed by exposing the gas to lime at selected high temperature and under controlled conditions, e.g. of CO and $CO_2$ content in the gas, such that the particles are essentially FeO, whereby a rapid absorption results, with substantial penetration of the lime pieces by iron oxide, at least in part producing a compound identified as dicalcium ferrite. Complete operation involves continuously calcining limestone and advancing the calcined lime lumps through a reaction zone while the fume-laden gas passes countercurrently through the solids, heat being supplied for the incoming gas and for the limestone calcination as needed. An iron-containing lime product results, preferably in discrete, non-clinkered pieces, having good physical properties and special advantages of reactive availability when used as lime feed in iron and steelmaking operations, accompanied by efficient recovery and use of iron values.

BACKGROUND OF THE INVENTION

(1) Field of the invention

This invention relates to procedure for treating iron-containing particles, carried in gas, especially fume that comprises iron oxide, to remove such particles and to yield a solid product of notably useful character. In a particularly important aspect, the invention is concerned with the treatment of gases that are discharged from furnaces employed in the making of iron and steel, so as to reduce or substantially eliminate the iron-containing fume commonly or often present in such gases, while preferably producing, as a result of the treatment, a product that represents recovery of iron values and is constituted in effect as a body of lime, such product having significant utility, as for example in furnace procedures for manufacturing iron and steel, or for other purposes.

The invention is thus directed to a new and unusually efficient process whereby furnace or like gases may be readily depleted of iron-containing particles that unless otherwise removed, as by use of conventional scrubbers, precipitators or similarly expensive operation, represent a source of atmospheric pollution, and whereby the iron values are recovered in an exceptionally usable form. Indeed the invention is further related to products, in effect consisting essentially of lime and the stated iron values, combined and circumstanced so as to be mechanically well adapted for handling and use and also, at least in preferred embodiments, so as to have superior properties when employed in various steelmaking operations, or the like, that require a supply of lime.

(2) Description of the prior art

The removal of so-called fume from off-gases in the iron and steel industry has become a persistent problem; such removal has been difficult or costly to achieve despite the theoretical economics of recovering iron content, yet the problem is serious because of the necessity of avoiding air pollution. Fume is apt to be developed from any of various furnace operations, especially for making steel by the open hearth and other processes, and may be unusually voluminous when oxygen is employed, as by lance-type supply, both in open hearth practice and in so-called basic oxygen furnaces. As a rule the fume consists chiefly, e.g., up to 90% or so, of minute iron-containing particles, which are generally iron oxide and as collected in ordinary ways, may appear as hematite ($Fe_2O_3$), although other oxide forms or even metallic iron may be present as the gases leave the furnace bath. Possibly originating at least in part by condensation of iron vapor, the particles of steelmaking fume are physically unusual in having an extremely small size, customarily in the range from about 0.05 to about 1 micron in diameter.

While in more general aspects, the new procedures described hereinbelow are not restricted to particles of such dimension and are deemed applicable to considerably larger particles as well, the described, extremely fine physical state of the iron-containing fume as carried in the gas, being actually an aerosol or colloidal dispersoid, makes collection and reuse of this material very difficult. Heretofore various techniques of wet scrubbing, electrical precipitation or the like have been used or proposed for collecting the fume, but these ordinarily involve large equipment and yield a product which because of its fine state of subdivision is very difficult to handle and indeed cannot be returned, as is, to the furnaces without problems of dust, and indeed without largely reappearing as fume.

It has been proposed (Canadian Pat. No. 698,147) to lead flue gas containing fume into a body of lime descending from a region where the latter material has been produced from limestone by calcining, such operation having been attempted and sought to be controlled in a way that the fume particles, appearing as $Fe_2O_3$ (hematite), would as such be absorbed, possibly reactively, with the lime. Experience with such treatment was found, however, to be unsatisfactory, even though carried out in a range of high temperatures; for example under some circumstances or temperatures the result was chiefly a deposit of a coating of red hematite particles on the surface of the lime lumps, or in some other instances a heavily clinkered mass of uncertain character and difficult utility. Efficient utilization of the limestone and heat values was not obtained, a particular difficulty being that in general and regardless of chance results, reproducible control was not found to be feasible.

It has also been known to attempt some combination of iron oxide particles, such as previously collected particles from furnace flue gases, or perhaps other material such as mill scale, with lime (which could be ordinary or dolomitic) in rotary kiln operations at very high temperatures, e.g. by feeding both the pulverulent iron oxide material and lime or limestone as supplied solids, with ultimate delivery of fused bodies which at least in part represent some chemical combination of lime and iron oxide. Such operation, however, even if applied to furnace fume, requires separate collection of the particles by conventional scrubbing. In other words, so far as is known, there has heretofore been no truly efficient method available for recovering iron-containing fume or the like as directly carried, e.g. suspended or dispersed, in gas such as the off-gases from steelmaking operations, and accordingly a chief object of the present invention is to afford new and notably useful procedure for such purpose. Additional objects and advantages of the invention, including the attainment of novel product material have been indicated hereinabove, and are explained or will be apparent in the following description.

SUMARY OF THE INVENTION

To the above and other ends, important aspects of the invention are predicated on the discovery that an unusually effective combination of gas-carried, iron-containing particles, e.g. particularly iron oxide fume, with bodies of lime (CaO) is achieved under coordinated conditions of temperature and oxidation-controlling influences, specifically such that the iron-containing material is presented to the lime in the form of wustite rather than in the state of oxidation in which the particles conventionally appear, at least for the most part, whether they arrive directly as fume in the furnace off-gas or whether they are otherwise derived, as by being separately collected from such or other sources and then injected into a supplied gas stream. Wustite, which is a known form of iron oxide recognized in studies of the combination of iron and oxygen, is essentially and can be conveniently defined as FeO, whereas the other, commonly occurring forms of oxide mentioned above are magnetite ($Fe_3O_4$) and hematite ($Fe_2O_3$), the latter being the composition which fume particles most usually tend to assume, at least ultimately, in off-gas from furnaces of the iron and steel industry.

In particular, the new process involves bringing the fume-carrying gas into contact with effectively active lime at a temperature in a selected high range while controlling the oxidizing and reducing influences in the gas so as to present or establish the fume or like particles in the stated wustite form. Under such circumstances, as at temperatures preferably in the range of about 2150° F. to about 2500° F., a remarkably fast combination of the iron oxide and lime occurs, in effect drawing the iron values into the porous lumps or like bodies of lime, at least partly in the form of what is understood to be a combination of CaO and FeO in a more or less transiently liquid state, whereupon there is formed (according to further present understanding), at least ultimately some quantity of a lime-iron oxide compound, specifically the compound that can be called dicalcium ferrite and that appears to have the chemical composition $2CaO \cdot Fe_2O_3$, this reaction also involving simultaneous production of particles, likewise deposited in the lime, that at least initially consist of elemental iron. A solid product results which usually comprises the described dicalcium ferrite and unreacted lime, as well as some other iron and iron oxide content, and which may be more broadly defined as a lime-containing or lime product especially in that the lime-iron oxide compound is itself available as lime for many purposes, for instance when the product is employed to provide the lime required in most steelmaking operations.

Whereas in the foregoing description the term lime has been used primarily with the connotation of ordinary lime, CaO, e.g. as derived by calcination of calcium carbonate in ordinary limestone, the procedure is usefully effective with lime derived from dolomite or other magnesian limestone of any usual proportion of magnesium carbonate to calcium carbonate, so that in a broad sense the lime employed may be essentially calcium oxide or combinations of the latter with magnesia (MgO). In specific operations exemplified below, the lime is mostly considered as being of ordinary character, essentially CaO and deriver from ordinary limestone ($CaCO_3$), and likewise references to lime in specific reactions and specific compounds with iron oxide are intended to mean calcium oxide. General references, however, to the use, calcination or treatment of limestone or limestone lumps or limestone material will be understood to include dolomite and other magnesian limestone as noted above, and similarly in speaking generally of the use, handling, treatment or production of lime, lime material or lumps, or a lime product, such materials will be intended to include those that contain MgO along with CaO, unless otherwise specified or apparent from the context. Indeed it appears that MgO may coact significantly in the absorption of iron values of fume, indeed possibly to the extent of producing some MgO-iron oxide complex, although probably not with any compound corresponding to the dicalcium ferrite that is understood to be formed from CaO, which is present, of course, in all cases.

It may be explained that furnace flue or stack gases usually comprise one or both of carbon monoxide (CO) and carbon dioxide ($CO_2$), or conceivably in some special operation other constituents of oxidizing-reducing effect such as water vapor ($H_2O$) and hydrogen ($H_2$), whereby the desired control or maintenance of oxidation-modifying conditions is effected with respect to the existing content of reducing constituent (CO or $H_2$) and the oxidizing influence as represented by $CO_2$ or $H_2O$, or equivalent oxygen as $O_2$. Thus in presently preferred practice of the invention and indeed as representing a particular feature thereof in one specific form, the process includes maintaining the ratio of CO to $CO_2$ in the gas within a particular range, namely about 0.1 to about 4 by volume, so as to achieve the desired state of oxidation of the iron-containing particles, i.e., as FeO. The optimum or theoretically desired result is that at the region of immediate exposure of the particles to the lime, an equilibrium condition of the particles as FeO exists, as for instance with the $CO/CO_2$ ratio there existing in the stated range.

As explained below, the required condition of oxidation-controlling influence in the reaction zone can be generically expressed in terms of so-called oxygen potential. Thus the above range of $CO/CO_2$ ratio corresponds to oxygen potential values determinable as equivalent to a partial pressure of oxygen in the range of about $10^{-6}$ to about $10^{-13}$ atmosphere, the latter figures also corresponding to the effective range of $H_2/H_2O$ ratio (between approximately 0.03 and 1.7, by volume) for maintenance of wustite. Defined in another way, the condition of the gas should be such that higher oxide forms of iron, e.g. $Fe_2O_3$, are substantially all reduced to FeO, yet at the same time there should advantageously be a sufficient minimum extent of oxidizing influence (or sufficient limitation on the reducing influence) as to prevent carrying FeO to elemental Fe in significant amount. Excess carbon monoxide or hydrogen can produce elemental iron, which does not itself undergo the stated reaction with CaO and therefore pro tanto impairs the desired operation of the process.

In a complete and preferably continuous form, the process involves supplying limestone and advancing it successively through a calcining region and then through a reaction zone, i.e., the region of combination of the freshly burned lime with the iron oxide particles as described above, the resulting lime-iron product being further advanced for withdrawal and ultimate use. The fume-carrying or equivalent gas can be supplied to the lime near the solids-exit end of the reaction zone, while the iron-depleted gas is conveniently withdrawn after passing through the limestone-burning region. The operation likewise includes supplying needed heat, e.g. for calcining the limestone, and usually also for maintaining the required reaction temperature. Heating may be effected with suitably fueled burners either at a lower part of the lime-burning region or more preferably at or near the solids-exit end of the reaction zone, and likewise in the gas intake.

Indeed a further feature of the process is that the defined reducing environment to be maintained in the reaction zone, is readily controlled by adjustment of the fuel burning operation in the arriving gas so as to modify the $CO/CO_2$ ratio by appropriate selection of fuel and oxygen for various degrees of combustion. The basic requirements are: (1) to maintain the required temperature in the reaction zone, as likewise to supply heat for calcination of the stone where such treatment is part of the operation, and (2) to control or adjust the gas composition; the foregoing modes of satisfying these requirements are notably useful, but in a general sense, other appropriate means can be employed, the operation in all cases being selected to suit conditions, such as the temperature of the supplied fume-laden gas, which may in some instances be relatively very high.

Although a product of some utility appears obtainable with certain operations at higher temperatures than above (up to about 2600° F.), as where the equipment permits advancing and crushing a fused or clinkered material, the result under the special, preferred conditions above, with effective maintenance of the iron as FeO, is a distinctly unusual lime product in the form of pieces or lumps. Each such piece may comprise a central core of essentially unmodified lime (CaO) surrounded by a preferably thick shell, of novel constitution, containing the stated lime-iron oxide compound. The shell or outer part has a microstructure consisting of a matrix of dicalcium ferrite, containing embedded bodies of lime, which may themselves be a mixture of lime and a minor amount of iron oxide present in a state that can be considered FeO but may vary to $Fe_3O_4$ or $Fe_2O_3$. Freshly prepared product also reveals minute particles of elemental iron, usually in the matrix or continuous phase. This unusual composition is believed to result from rapid combination of lime with wustite, causing an iron-rich lime material or complex of FeO and CaO (in what appears to be, but perhaps may not be, a liquid state) to penetrate, as it forms, deep into each lump of lime. In the reaction then or thereafter to form dicalcium ferrite, the FeO appears to disproportionate to $Fe_2O_3$ and Fe.

The resultant iron oxide-lime product has excellent physical structure for advance as a bulk solid through and out of the kiln or other vessel and for subsequent handling and use, e.g. as a source of lime in steelmaking, where it has special advantages of reactive availability while economically restoring iron to such operations.

Further details and examples of the process and product are set forth hereinbelow, including additional advantages and features of novelty.

BRIEF DESCRIPTION OF THE DRAWING

In the drawing:

FIG. 1 is a simplified process diagram, showing the chief features of supply of material and gas and the chief functioning steps and features of control, for ultimate delivery of a fume-depleted gas and recovery of an iron-enriched lime product, exemplified as for performance of the process in an upright vessel;

FIG. 2 is a cross-section of an example of the product, with a part as if greatly magnified, to provide a qualitative showing of the structure, in simplified and diagrammatic form.

DETAILED DESCRIPTION

Although the process in its broader aspects is not limited to particular apparatus, e.g. in that when practiced continuously the travel of solid material may be effected in a vertical, horizontal or other suitable direction and various means may be employed for introducing and removing solids and gases as well as for applying heat and controlling the gaseous atmosphere, the drawing illustrates the operation as performed, with special advantage, in a vertical kiln, which may be of known, refractory-lined construction such as used for calcining limestone or for other high temperature operation utilizing and discharging solid material. Thus as shown the complete operation involves feeding limestone lumps into the top and withdrawing the solid product pieces of iron-containing lime material at the bottom, so that the solids continuously fill the vessel as a permeable mass, traversing in succession a lime-burning region where the limestone is converted to lime (CaO), and then a reaction region under controlled conditions. The gas that carries the iron-containing particles, specifically fume-laden furnace gas, is passed through the reaction zone; although conceivably the travel of solids and gas may here be cocurrent, advantage is found in advancing the fume-laden gas countercurrently through this region and then continuing the travel of gas through the lime-burning space or column, so that the ultimate off-gas, substantially depleted of iron oxide particles, also serves to withdraw the gaseous or gas-carried products of calcination, chiefly carbon dioxide.

For the special results elsewhere described herein, i.e., as to free travel and discharge of solids, ready permeation into the lime, and thus efficient removal, of the iron fume, and yield of an unusually useful product of iron-containing pieces of lime, the reactive contact of the lime with fume is maintained at a temperature in the range of about 2150° F. to 2500° F. This condition for the lime-iron oxide reaction is readily achieved by maintaining such temperature in the reaction zone (where the fume-laden gas traverses the interstices between the lime pieces), e.g. as measured by appropriate thermocouple or other means in the zone or recessed in its refractory lining.

Heat is conveniently supplied, as by gas burners, at a locality which may be below the point of introduction of the fume, and such heat not only serves the reaction zone but also the calcining region above, to provide the necessary burning of the limestone to lime, say at temperatures in the range of 2100° F. to 2500° F. Thus the burned lime reaching the reaction zone is within or close to the temperature desired there, it being further noted that because of the required presence, in effect, of CO or equivalent reducing agent in the controlled gas composition in the reaction zone, useful heat units can be contributed in such form to the calcining zone by the gas stream that is under treatment. These heat units, e.g. of CO, may be present in significant amount (in preferred operation) and are used by combusting them, in effect, as they enter and penetrate the calcining region. Hence the amount of heat needed by direct supply from the main burners or the like can be somewhat reduced and the gases exiting the kiln are stripped of heat units as well as iron dusts.

In general essentially the only additional heat adjustment needed is for the incoming gas from a steel-making or like operation. If as may be the case in some situations of off-gas from the oxygen blow in a so-called basic oxygen furnace, or possibly as resulting from some conditions of operation of an open hearth furnace, the fume-bearing gas has a temperature well within the stated reaction range, no supplemental heat may be required. In other and possibly more common instances, the gaseous feed to the present process may have a significantly lower value, e.g. well below 2150° F., either because of the nature of the furnace operation or simply because of heat loss in conduction of the gas from the furnace. Thus the process may include supplying additional heat to the incoming gas, advantageously at a locality in the gas duct adjacent to the kiln, as for example with an open flame burner which is furnished with gaseous or other fuel and with oxygen or air, and which is controlled to aid in reaching or maintaining suitable temperatures.

In summary, the heat requirements are for provision of the desired temperature in the fume-lime reaction zone and for calcining the limestone to lime. Although depending on circumstances, actual heat supply, as from a fueled source, conceivably may or may not be needed at one or more localities noted or may be provided at other places or in other ways, the foregoing, as in FIG. 1, represents a procedure or arrangement that has been effective to assure the needed heat while taking advantage of heat values or units inherently present.

A particularly important feature of the process, as explained, is maintenance of conditions such that the iron of the fume or equivalent particles is presented, to the lime, essentially in the form of wustite or FeO. Although there has apparently been some belief heretofore that to effect a combination of lime with iron oxide the latter could and presumably should be present in one of the normally occurring higher states of oxidation, e.g. $Fe_3O_4$ or $Fe_2O_3$, very unusual results, as explained above, have been found attainable by getting the iron content of fume or the like into the divalent state represented by FeO, the latter compound being one which does not regularly exist, as an equilibrium phase of simple iron-oxygen systems, at temperatures much below 1000° F. and which at the higher temperatures only occurs in the presence of a specific balance of reducing and oxidizing influences. Conditions for establishment of FeO or wustite have been known, from studies unrelated to the present process or to its underlying problems, and have been set forth in equilibrium diagrams and other data.

A convenient way of providing conditions to present the iron oxide as FeO, is to control the content of carbon monoxide (CO) and carbon dioxide ($CO_2$) in the gas, specifically to achieve a $CO/CO_2$ ratio in the preferred range between 0.1 and 4, by volume. In practice, narrower limits of the ratio may conveniently be observed, e.g. upwards of 0.5 or downwards of 3.5; indeed a specific target ratio or range of ratios (within the broad limits) may be selected as best suiting the character of the fume under treatment. Since analytical procedure and instrumentation for determining a $CO/CO_2$ ratio are well known, providing essentially immediate readings, and appropriate for small streams or other samples of gas such as may be withdrawn continuously or at intervals from the reaction zone of the vessel, the requirements of the present process are readily satisfied by adjusting the composition of the incoming gas, e.g. from time to time or by continuous means, so as to maintain the desired condition in the reaction zone as ascertained by such analytical readings. Indeed at the temperatures here involved, a determination of the concentrations of carbon and oxygen taken as elements (and regardless of their transient form in combination or including free oxygen), is directly translatable as a reading of $CO/CO_2$ ratio in any combination of these elements that permits both compounds to exist.

A ready way of achieving the defined regulation is by control of the burners employed for heating the reaction zone and the incoming fume-laden gas; for instance by varying the proportion of fuel and oxygen or air supplied to the burner in the incoming stream, the gaseous material delivered as a result of combustion of correspondingly varying completeness, will in effect increase the relative content of CO, $CO_2$ or oxygen as may be desired. While sampling and test of the incoming gas, either upstream or downstream of such burner may be additionally informative or useful, it is presently considered that effective control is attainable by adjustment of the burner and its supply means so that the analytical carbon-oxygen determinations of the reaction zone gas reveal the maintenance of the desired $CO/CO_2$ ratio.

Indeed ordinarily, with flue or hood gases from steelmaking processes, changes in the composition of such gas as released from the furnace are apt to be slow or are apt to follow a recognizable pattern, so as to facilitate control of the conditions of the present process by the above modification of the gas. Furthermore, it is conceived that in the light of experience with the present process, a person responsible for the operation of a given steelmaking or like furnace, having cognizance of the composition of the furnace off-gas, as by the usual testing, and preferably also of the state of oxidation of the iron content of the fume, can control the functioning of the process, if necessary by adjustment of one or another of the burners indicated, to maintain the desired $CO/CO_2$ condition or indeed the desired FeO condition of iron in the reaction zone, without much, if any, actual testing of either condition there. In other words, if the fume is being effectively removed and if the lime product indicates significant iron absorption, e.g. with characteristics as elsewhere explained herein that are inherently indicative of an appreciable content of dicalcium ferrite, the operator may very well be able to control the operation for good fume removal and a good product and thus in fact for consistent maintenance of necessary conditions, without conscious attention to chemistry in the reaction zone or product.

With the lime pieces arriving in the reaction zone as porous bodies of freshly calcined, active lime, maintenance of the defined conditions of temperature and oxidizing or reducing influence result in an unusual combination and reaction of the iron oxide with the lime. Specifically, it is reduced that the iron values present as FeO form a complex with CaO, this complex or equivalent composition being apparently in an at least transiently liquid state and appearing to be absorbed or drawn deep into the lime pieces, with great rapidity; in any event there appears to be an almost instantaneous penetration of the lime bodies by the iron oxide. Then or thereafter (possibly as the bodies cool or begin to cool) the FeO at least in substantial part appears to combine chemically with CaO to form dicalcium ferrite and thus to yield the dark-colored matrix structure described above and shown at 16 in FIG. 2. More particularly, the reaction is understood to be essentially as follows:

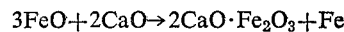

Microscopic examination of the freshly prepared, dark or blackish product pieces has revealed particles of elemental iron (indicated at 12 in FIG. 2) in and about the matrix of $2CaO \cdot Fe_2O_3$, in conformity with the above equation, while chemical analysis of the matrix material 16 agrees with the above formula for dicalcium ferrite.

In practical operation, the discharged lime pieces may have a core 14 (FIG. 2) of essentially unreacted lime (CaO), surrounded by a more or less thick shell 15 of combined composition, which is found to consist of the above continuous phase or matrix 16 of dicalcium ferrite having embedded in it, i.e. as a more or less dispersed phase, granules 10 of lime or of a lime-iron oxide mixture. Under the presently preferred conditions the apparent liquid state of the material which provides the stated reaction product as a continuous phase is essentially momentary, so that there is no fusion or appreciable sintering between the lime pieces or indeed any significant clinkering of the pieces themselves as can occur when there is a greater production of lime-iron oxide complex or compound in the liquid state.

The product ultimately withdrawn, e.g. more or less continuously by appropriate means at the foot of the kiln, consists of fairly hard, dry, discrete lumps or pieces, usually black in color, each having a coherent nature, the ferrite shell being of a somewhat sintered character. Such product is readily handled, forming a flowable mass in bulk, without problems of sticking or dusting, and has good dimensional stability and weatherability. The discrete pieces are identifiable, e.g. upon being broken, split or crushed, by the structure and microstructure explained above, usually including the presence of elemental iron particles, although because of some residual porosity and the corresponding access of air, such particles may sooner or later be converted to oxide form, e.g. $Fe_3O_4$ or $Fe_2O_3$. While a theoretically optimum product might consist entirely of the described structure of matrix and embedded particles, in practice some core 14 of calcium oxide usually remains, to a greater or less extent, into which there may be relatively little penetration of iron oxide. As an example, in certain satisfactory products of this character, the iron content of the composite shell, measured as $Fe_2O_3$, has been 12% to 15% by weight.

Although the invention is not limited by theory, it appears that both the lime and especially the iron-bearing particles in the wustite state are extremely reactive, and that the defined conditions of the process provide a controlled reaction yielding dicalcium ferrite, the latter compound itself being one which has been known as a phase or part of a phase of certain previous iron oxide-calcium oxide systems. In any event, substantial departure from the above conditions, in most directions, has shown adverse effects as to the desired results.

Thus, for instance, where the $CO/CO_2$ ratio is maintained in the stated range, yet the temperature in the reaction zone is allowed to fall below about 2100° F., essentially no chemical reaction between the lime and iron-bearing fume occurs and the discharged lime pieces are merely coated with iron oxide, deposited as or becoming $Fe_2O_3$, and appearing as a red or darker surface layer. The amount of iron collected is relatively small, being generally less than 1% (as Fe, by weight) of the lime body. In contrast, use of temperatures within the range affords good impregnation, in effect by the iron oxide as wustite, yielding the preferred product as described above, wherein the total iron content, as Fe by weight, may vary from about 3% to about 15% (preferably at least about 5%) of the complete lime product. Where the reaction zone temperature rises above about 2500° F., a product of more or less clinkered nature is usually reached. While in some cases, with appropriate equipment, compositions that have thus involved excessive fusion or excessive production of material in liquid form may be useful, to attain high iron concentrations, the operation becomes very difficulty controllable in a vertical kiln or the like and the novel, flowable bulk solid as described is not achieved. The usual result of excessive temperature is cohesion or clinkering together of the mass in the kiln, producing blockage and also some interference with absorption or reaction in the lime, so that the process cannot be properly carried out. These problems become more serious as the temperature is raised, indicating that even with special equipment for handling clinkered material (at least unless such equipment can deal with a completely fused mass) reaction zone temperatures substantially above 2600° F. are not ordinarily feasible.

The critical nature of the state of oxidation-modifying influences in the reaction zone has also been noted by test. For instance, wheer the temperature is in the preferred range but the $CO/CO_2$ ratio drops below 0.1, the effect is to interfere with production of dicalcium ferrite; when oxidizing influence thus predominates excessively, penetration of iron oxide is slower, total collection of iron values is relatively poor, and such reaction as occurs seems to be more fluid, or even to have a tendency to objectionable slagging when higher temperatures are used in efforts to obtain more than a thin layer of absorbed iron values. When the $CO/CO_2$ ratio is permitted to rise substantially above 4 or 4.5, reducing influence is excessive and results, even at preferred temperature, tend to be incomplete, as with little more than a dark surface coating of possibly some of the ferrite (with iron and/or iron oxide) on the lime pieces, and as the temperature is raised, the results tend to become poorly controllable and erratic.

In summary: when the temperature is well within the operating range, the simultaneous occurrence of only a thin coating or layer on the lime and an objectionably high fume content in the kiln exit gas, is usually indicative of improper atmosphere in the reaction zone; in many such cases, too low a content of CO (insufficient reduction of $Fe_2O_3$ to FeO) yields a dark coating recognizable by being easy to scratch, revealing light-colored lime, whereas excess of reducing influence (too much CO) tends to yield a thin but abrasion-resistant layer. It will be understood that for best results in practical operation, some account should be taken of the amount and the oxidation state of the fume as it passes through the duct to the kiln, e.g. in that the desired absorption and reaction of FeO in lime is very rapid and attempts to keep the $CO/CO_2$ ratio in esuilibrium at one limit or the other of the stated range may not allow timely conversion of fume to FeO. For instance, with fume essentially all in the $Fe_2O_3$ state (as from an oxygen blow in an open hearth), the $CO/CO_2$ ratio should preferably be well above 0.1, e.g. upwards of 0.5, indeed advantageously toward the higher end of the range, viz. 3 or 4. Likewise with fume that may be largely Fe, as from a basic oxygen furnace of the so-called hooded type, the ratio is preferably well under 4, e.g. 3 or less, and may very advantageously approach the lower end of the range.

Suitable temperatures for the reaction zone have been indicated above, being a range from about 2150° F. upward, that will provide useful iron loading of the lime without excessive fusion. Special advantage is usually had in a narrower temperature band, e.g. about 2250° F. to about 2400° F., it being preferable to avoid temperature extremes when the oxidation-controlling influence is allowed to reach one end or the other of its above-stated range.

For best operation the lime pieces reaching the reaction zone should be fully calcined, having the full porosity and reactivity of CaO in the form of properly burned lime. Such porosity may be defined as from 25% to 55% void, by volume, in the lime structure, preferably in the upper part of this range. Accordingly the temperature of lime calcination in the corresponding zone of the kiln should usually be kept below about 2600° F. and upwards of 1800° F., e.g. preferably in a range of 2100° F. to 2400° F. as recognized for best results in calcining ordinary limestone. As is known, lime burned at excessive temperatures tends to have poor porosity and at least for that reason, poor reactivity.

While the exact size of the lime pieces is not critical, it is apparent that larger pieces may be easier to move and handle both as stone and as product and can provide less gas flow resistance when constituting a bed, whereas smaller pieces afford a larger total surface area (for fume absorption) per unit weight. Selection of size or size range may therefore represent any desired balance of these and other considerations. In some cases it may be convenient to use small limestone lumps or granules, as down to about one-half inch in size (measured by the longest dimension), or in other cases larger pieces, e.g. up to six inches or more, but these are merely examples. In presently preferred operation of the process, the iron-containing lime product is discharged with approximately identical dimensions, e.g. in that the pieces of the preferred product are physically unchanged in size and shape, relative to the original limestone or lime lumps. As will be apparent, the process can be performed with a supply of previously burned, appropriately active lime in lumps, pieces or granules, but for many purposes the combined operation of burning limestone and treating the resulting lime to absorb fume is unusually efficient and economical.

As indicated above, the iron oxide or iron particles in the fume are ordinarily very minute, in the colloidal range, although of course the process is effective for larger particles, indeed essentially any size that can be carried in a gas stream, as for instance any particles passing, say, 28 mesh (Tyler). Commonly the fume may be present in amount of 2 grs. (grains) to 40 grs. per cubic foot of furnace gas. Oxide fume will usually have a composition containing about 55% to 65% iron (as Fe), which when determined as $Fe_2O_3$ is from 78% to 93% or more of the fume solids. Other components of the fume may be very small amounts of silica ($SiO_2$), lime, magnesia (MgO) and manganese as oxide. For instance, a typical analysis range for iron-containing fume solids as appearing in off-gas from a steelmaking furnace during an oxygen blow is: about 90% $Fe_2O_3$, 1% to 2% $SiO_2$, 2% to 6% CaO, 1% to 1.5% MgO and 0.5% to 1.5% MnO. With fume of this character, and the process performed under presently preferred conditions as above, e.g. a temperature of about 2300° F. (or between 2200° F. and 2400° F.) and a $CO/CO_2$ ratio of about one (or between 1.0 and 1.8), amounts of iron equal to 90% to 95% or so of the original iron content of the fume are removed. The ultimate gas discharge from the kiln will usually contain a very minor amount of fume or solid particles (including the remainder of the iron material and some entrainment of lime particles), which can if desired be removed by simple water scrubbing, e.g. in coaction with any blower or equivalent means that may be employed to draw the gases through the kiln. It is thus readily possible to yield a final discharge of gas which offers no significant pollution of the atmosphere.

The process is equally applicable to iron-bearing particles carried in other gaseous mixtures, as for instance mixtures considered to contain hydrogen and water vapor, with corresponding control of oxidizing influence, e.g. so that the iron oxide is substantially all reduced to wustite but not significantly further to metallic iron. Indeed it is found, in accordance with known principles, that the required condition as to reducing the oxidizing influence may be generically defined in terms of oxygen potential, expressed as partial pressure of oxygen ($O_2$). Specifically the desired condition is definable as represented by a partial pressure of oxygen in the broad range of $10^{-6}$ to $10^{-13}$ atmosphere, or a preferred range of $10^{-7}$ to $10^{-12}$, it being appreciated that this expression is an understood designation or measure of gaseous oxidizing influence and does not necessarily identify an actual content (or preclude a higher one) of free oxygen, as for instance in that a mixture supplied as carbon monoxide, carbon dioxide and oxygen may nevertheless, with a sufficient concentration of carbon monoxide, represent a $CO/CO_2$ ratio (at high temperature) in the above-preferred range and thus a partial pressure of oxygen, considered as oxygen potenial, in the stated extremely low range of not more than about $10^{-6}$ atmosphere. The following table sets forth, for the range of ratios of $CO/CO_2$ between 0.1 and 4.0, corresponding values of $H_2/H_2O$ ratios understood to be appropriate for maintaining wustite under the recited temperatures, and also the corresponding values of oxygen potential, as partial pressure of $O_2$ (the noted values, of course, being susceptible of considerable approximation):

| Temp., °F. | P.P. of $O_2$, atm. | | $CO/CO_2$ | | $H_2/H_2O$ | |
|---|---|---|---|---|---|---|
| | From | To | From | To | From | To |
| 2,100 | $2.2 \times 10^{-10}$ | $1.4 \times 10^{-13}$ | 0.1 | 4.0 | 0.042 | 1.67 |
| 2,200 | $1.4 \times 10^{-9}$ | $8.9 \times 10^{-13}$ | 0.1 | 4.0 | 0.038 | 1.53 |
| 2,300 | $6.8 \times 10^{-9}$ | $4.6 \times 10^{-12}$ | 0.1 | 4.0 | 0.036 | 1.42 |
| 2,400 | $3.1 \times 10^{-8}$ | $2.0 \times 10^{-11}$ | 0.1 | 4.0 | 0.034 | 1.32 |
| 2,500 | $1.3 \times 10^{-7}$ | $8.3 \times 10^{-11}$ | 0.1 | 4.0 | 0.032 | 1.24 |

Accordingly control of the process can be achieved by suitable adjustment of gas composition, as to any combination of reducing influences (CO, $H_2$) and oxidizing influences, so long as the oxygen potential (in the reaction zone) is kept within the approximately stated range. Of course, if much or most of the fume or like particles originates in the from of $Fe_2O_3$ (or $Fe_3O_4$) there must be a sufficient concentration of reducing influence at the selected temperature (maintained effective at a suitable ratio) to produce the necessary change of oxidation state, or likewise sufficient oxidizing influence to the extent that the fume is elemental Fe. Ordinarily furnace and like gases have abundant content of carbon and oxygen which when corrected as necessary in $CO/CO_2$ ratio will serve the above purposes, as for example, in that the total content of CO and $CO_2$ together is usually upwards of 20% by volume although about 10% seems enough for present purposes (or conceivably as little as 2% or 3% CO); in any case, the requirement is simply for an adequate amount of reducing or oxidizing component relative to the quantity of iron material that must be changed to wustite.

The foregoing chiefly presupposes that the supplied limestone is of ordinary variety, consisting essentially of $CaCO_3$, but as also indicated, other limestone or lime compositions can be used, i.e. magnesian limestone or lime, for instance dolomite or dolomitic limestone, which contains significant amounts of magnesium carbonate, appearing in the lime as MgO. Tests indicate that for preferred results with the usual magnesia-bearing lime, somewhat higher temperatures in the reaction zone are desirable, e.g. of the order of 50° F. to 100° F. more. Hence in a somewhat broader sense the temperature conditions can be expressed as about 2150° F. to about 2600° F., it being noted that results of some utility are attainable with ordinary lime in the highest part of this range and with magnesia-bearing lime in the lowest part.

The procedure and principles of the invention have been established by extensive test, not only in subjecting standardized bodies of reactive lime to fume-laden gas under a large variety of conditions as to temperature and composition of the gas (e.g. in $CO/CO_2$ ratio) but also in numerous operations with a small scale batch-type reactor consisting of a horizontal refractory chamber through which hot, fume-carrying gases could be passed under the suction of an air-operated ejector at the outlet. In the latter tests, the reactor was charged with burnt lime of suitably reactive nature for about one-third of the distance from its gas inlet end, the remaining two-thirds being charged with raw limestone, all such solids being in pieces dimensioned about one inch by one-half inch. High temperature, fume-laden gas derived directly from an open hearth furnace during an oxygen blow was supplied to various successive charges of the reactor. While in these tests no attempt was made (as by supplying additional heat) to effectuate full calcination of the raw limestone, the above-described reaction and combination of iron-containing fume from the gas with the lime was obtained at entering temperatures of the gas in a suitable range, e.g. 2150° F. to 2450° F., providing the $CO/CO_2$ ratio of the furnace gas fell within or was adjusted to fall within the stated limits. In such cases the described, well-reacted product was reached in the lime. In instances where substantial departures from the limits of the process were such as to produce an unwanted product, for example a badly clinkered material, these test operations were self-interrupting in that the solids quickly blocked the passage of gas.

The process has also been performed, for practical test purposes, in vertical, refractory-lined kilns with continuous or semi-continuous feed of limestone and discharge of iron-containing product, in the general manner of the drawing. Thus for example with a kiln providing an active bed height (for limestone-calcining in its upper part and fume-lime reaction below) of about 7 feet and internal, rectangular cross-section area of 2.2 square feet, ordinary limestone in sizes of the range of one inch to two inches was fed into the top of the kiln with corresponding withdrawal of product in the same lump form at the bottom, considerably below the active region. Heat was supplied by burners across the kiln about one foot below the active bed or column, such that the bed reached maximum temperatures of 2300° F. to 2400° F., for the reaction zone and for thorough burning of the limestone descending in the bed portion above such zone. At the lower end of the active bed (above the burners) hot fume-laden gas was brought into the chamber, which of course was there filled with the lumps of freshly calcined lime, so as to pass upward through them and through the limestone and then discharge in an appropriate duct, near the top of the kiln, having a blower for suitable draft. The gas conduit leading to the kiln was provided with an internal burner, supplied with oxygen and natural gas fuel.

In this example, gas from an open hearth furnace during a period of oxygen blowing reached the region of the last-mentioned burner at a temperature of about 1300° F., with considerable variation, and contained in average of about 7 to 9 grains of fume per cubic foot (likewise with much variation) in the extremely fine particle size described above. The inlet duct burner raised the gas temperature to about 2000° F. or so. Such fume had a content of about 90% iron oxide measured as $Fe_2O_3$. Readings of gas composition and temperature were attainable in various parts of the gas path and kiln.

As an instance of one of numerous satisfactory runs, during blows, the burners in the kiln maintained a temperature in the reaction zone of about 2240° F. to 2400° F., with a $CO/CO_2$ ratio of between 0.1 and 2.5. Under these circumstances the quantity of solids in the diluted gas leaving the kiln was reduced to about 0.2 to 0.5 grain per cubic foot, having a composition of chiefly iron oxide with some lime, but representing, because of its greatly reduced total quantity, a removal of well over 90% of the iron that has been received in the furnace gas. The iron-containing lime product delivered at the foot of the kiln, at a rate equal to 150 pounds per hour during these blow periods, had the preferred structure and characteristics described above, in discrete, readily-handled pieces, that could be and were employed very satisfactorily as lime additions in steel-making operation.

As another example, a special test was run in a much larger kiln of like arrangement, by injecting previously collected fume of a steelmaking furnace, into gases traversing the kiln, so that about 590 pounds of fume in an hour were carried through the bed of freshly calcined lime lumps, in gas (including the burner combustion products) passing at about 585,000 cubic feet per hour, the dust loading being about 7.1 grains per cubic foot. The temperature in the zone of reaction of lime lumps was in the range of about 2300° F. and above, but under 2500° F., and the $CO/CO_2$ ratio was indicated to be about 2 or 3. The supplied fume contained about 90% iron measured as $Fe_2O_3$. The product was of the preferred character described above (see FIG. 2), being discrete lumps having a substantial thickness of the reacted layer, and containing iron, measured as $Fe_2O_3$, equal to about 8½% of the average lump and 14% to 15% of the reacted layer, by weight. The solids content of the off-gas from the kiln averaged about 0.38 grain/cu. ft., including 0.19 grain of iron oxide per cu. ft., representing a reduction of nearly 95% of solid content, and over 97% as to iron oxide. These off-gas solids were further, greatly reduced by a conventional scrubber.

The special products of the invention appear to be exceptionally advantageous for use in the refining of steel, as for conventional purposes of removing sulfur, phosphorus and/or silicon. Evidence indicates that the product is rapidly reactive and indeed more efficient, especially in circumstances where slagging with silica is to be achieved. Apparently the presence of iron oxide compounds or other iron material deep within the lumps causes the latter to behave as if of unusual porosity, avoiding impediment that often arises by premature coating of lime lumps with silicate slag. Thus for instance the product, in large amount, has been observed to go into solution in the molten bath of a steel furnace in one-fifth of the time required for ordinary lime. These characteristics are notably realized in the preferred, so-called dry form of the treated lime pieces, i.e. where there has been no large amount of fusion or clinkering, and where the iron-impregnated structure is substantially as described.

In the preferred operations, as stated, the product may conceivably contain up to 15% or 20% of iron measured as such, by weight, of the total pieces, useful results being had even where the dicalcium ferrite-matrix shell is relatively thin so that the iron content of an average size lump is not more than about 2% or 3% of the whole. Of the total amount of iron carried by the product, a significant proportion by weight (e.g. upwards of 25%) is preferably present as dicalcium ferrite, as at 16 in FIG. 2, this proportion being very advantageously as much as 50% to 70% or more. In the product having the illustrated type of structure, a large preponderance of the remainder of the iron is usually found in the predominantly lime-bearing phase 10.

If the apparatus is of specially designed character, as for example employing horizontal, moving grates or the like and appropriate means for crushing the product, operation is conceived to be feasible at the higher temperatures that yield a clinkered or more or less fused mass, which may contain up to 50% iron or so, e.g. up to almost complete conversion of the lime to dicalcium ferrite. Such operation, where the fume-laden gas is controlled to have the stated wustite-producing character, can be regarded as useful, both in removing fume and as to the iron-containing lime product.

Reverting to the control of the process, especially for making the non-clinkered product, it has been indicated above that at least with some running or periodic temperature check and under conditions where substantial variations in supplied gas composition are not exhibited or are predictable or readily determinable, useful control may sometimes be possible simply by observation of the product itself, which can inherently reveal whether the reaction zone atmosphere is correct for providing or maintaining the iron as FeO. It will be appreciated, too, that the direction of adjustment of the burner or like means to change the oxidizing-reducing influence in such atmosphere in one way or the other is directly related to the fuel-oxygen proportions, and therefore it is easy to correlate such adjustment with a need for it, whether ascertained by a determination of $CO/CO_2$ ratio or by a deficiency of recognized significance in the iron-lime product.

It is to be understood that the invention is not limited to the specific steps and compositions herein described but may be carried out in other ways without departure from its spirit.

What is claimed is:

1. A process for incorporating iron values of iron-containing particles into lime to produce a substantially non-clinkered lime product consisting of lime-iron oxide bodies that contain iron oxide at least partially combined therein as dicalcium ferrite, comprising:
    (a) effecting contact of said iron containing particles with lime in a gas at an elevated temperature, in the range of at least about 2150° F. to less than 2600° F., which temperature range is insufficient for substantial fusion of the product,
    (b) while simultaneously presenting the iron content of the particles substantially in the form of FeO, by controlling the composition of said gas, which contains reducing material plus oxidizing material in proportions sufficient to govern the oxidation state of the particles, said gas being selected from the group consisting of (1) CO plus $CO_2$ and (2) $H_2$ plus $H_2O$, the proportion by volume of CO to $CO_2$ being in the ratio of about 0.1 to 4 and of $H_2$ to $H_2O$ being in the ratio of about 0.03 to 1.7, thereby affording an oxygen partial pressure of $10^{-6}$ to $10^{-13}$ atmosphere,
    (c) absorbing said FeO into the lime at said elevated temperature to produce said lime-iron oxide product and
    (d) withdrawing said product without substantial fusion thereof.

2. A process as defined in claim 1 in which said iron-containing particles are carried in said gas and said contact of said particles with the lime is effected by exposing the lime to said particle-carrying gas at said elevated temperature while simultaneously effecting the aforesaid control of the composition of the gas to present the iron content of said particles substantially in the form of FeO.

3. A process as defined in claim 1, wherein the temperature of exposure of the lime to the particle-carrying gas is maintained below about 2500° F.

4. A process as defined in claim 2, wherein said lime bodies consist essentially of CaO and said temperature of exposure of the lime bodies to said particle-carrying gas is maintained at a value in a range of about 2150° F. to about 2500° F. to produce the aforesaid substantially non-clinkered product bodies.

5. A process as defined in claim 2, which includes supplying gas containing CO plus $CO_2$ and carrying said iron-containing particles of which at least a substantial fraction are elemental Fe, and adjusting the volume ratio of CO/CO₂ in the gas to maintain it at a value not higher than about 3.

6. A process as defined in claim 2, which includes supplying gas containing CO plus CO₂ and carrying said iron-containing particles which are substantially in oxide form and of which at least a substantial fraction are Fe₂O₃, and adjusting the volume ratio of CO/CO₂ in the gas to maintain it at a value not lower than about 0.5.

7. A process as defined in claim 2 in which said gas carries particulate fume constituting said iron-containing particles and in which said gas is depleted of said fume by absorption of the fume substantially in the aforesaid form of FeO, into the lime.

8. A process as defined in claim 1, in which the step of controlling the composition of said gas comprises treating said gas as it is brought into contact with the lime bodies, by burning carbon-containing fuel with air or oxygen and delivering resulting combustion products comprising oxidation-controlling oxides of carbon into the gas, and controlling said combustion of fuel to maintain in the gas a mutual proportion of oxides of carbon selected to present the iron of the particles substantially in the form of FeO.

9. A process as defined in claim 8, in which said combustion operation is effective to deliver heat into said gas, said combustion operation being controlled to maintain the temperature of contact of the gas with the lime at a value in the range between about 2150° F. and about 2500° F. and to maintain a volume ratio of CO/CO₂ in the gas in the range between about 0.1 and about 4, for producing said product bodies as substantially non-clinkered lime bodies having at least an outer, iron-containing portion which is substantially constituted as a matrix phase of said dicalcium ferrite and a dispersed phase comprising quantities of lime or of lime with admixed iron oxide.

10. A process as defined in claim 9, in which said product bodies are produced to contain at least about 5% of iron by weight, and at least about 25% of said contained iron is present in said dicalcium ferrite.

11. A process as defined in claim 9, in which at least about 50% of the contained iron in said product bodies is present in said dicalcium ferrite.

12. A process as defined in claim 2, which includes calcining bodies of limestone with heat to produce the aforesaid lime as discrete, porous bodies and advancing said heated, freshly calcined lime bodies through a reaction zone while there effectuating said step of exposing the lime to said particle-carrying gas, said limestone and lime bodies being advanced along a predetermined path to and through said reaction zone while said gas is advanced countercurrently along said path through said lime and limestone in succession.

13. A lime-containing product produced according to claim 1 in the form of discrete, substantially non-clinkered pieces, each piece being a coherent body consisting of an inner core which consists essentially of lime, and an outer portion consisting essentially of two mutually discrete phases distributed therein and respectively composed essentially of dicalcium ferrite and of lime or lime with admixed iron oxide, said dicalcium ferrite phase being a matrix phase and said phase of lime or lime with iron oxide being bodies dispersed in the matrix phase, the total content of iron in said pieces being at least about 3% by weight as Fe, and at least about 25% of said iron content being present as said dicalcium ferrite.

14. A lime-containing product produced according to claim 1 in the form of discrete, substantially non-clinkered pieces, each piece being a coherent body having an outer portion exposed at and extending inwardly from the surface of the body which consists essentially of a substantially continuous phase of dicalcium ferrite with particles of elemental iron therein, and a substantially dispersed phase which is lime containing at least a minor proportion of iron oxide distributed therein, said body having a central core consisting essentially of lime, the total iron content of the pieces being at least about 5% by weight as Fe, and the iron content of said outer portion being at least about 12% by weight as Fe₂O₃.

References Cited

UNITED STATES PATENTS

| | | | |
|---|---|---|---|
| 3,105,757 | 10/1963 | Péras | 75—1 |
| 3,350,195 | 11/1967 | Mills | 75—4 |
| 3,351,459 | 11/1967 | Mills | 75—4 |
| 3,519,386 | 7/1970 | Fedock | 75—94 |
| 2,810,633 | 10/1957 | Cooper | 75—5 |
| 3,326,670 | 6/1967 | Bratton | 75—25 |
| 3,365,340 | 1/1968 | Tisdale | 75—25 |
| 3,460,934 | 8/1969 | Kelmar | 75—25 |

FOREIGN PATENTS

| | | | |
|---|---|---|---|
| 698,147 | 11/1964 | Canada | 75—25 |

CHARLES N. LOVELL, Primary Examiner

P. D. ROSENBERG, Assistant Examiner

U.S. Cl. X.R.

75—1, 3, 94; 423—138